May 14, 1935.  F. E. STAHL  2,001,072
BUCKLE
Filed Sept. 2, 1932

INVENTOR
FRANK E. STAHL
BY J. W. Ellis
ATTORNEY

Patented May 14, 1935

2,001,072

UNITED STATES PATENT OFFICE 2,001,072

BUCKLE

Frank E. Stahl, Tonawanda, N. Y., assignor to Columbus McKinnon Chain Corporation, Tonawanda, N. Y., a corporation of New York Application September 2, 1932, Serial No. 631,519

7 Claims. (Cl. 24—193)

My invention relates in general to improvements in buckles or fasteners, and in particular to buckles used with flexible straps in connection with anti-skid devices for automobile tires. While my invention may be useful in many ways, I have in the accompanying drawing and following description shown and described its application to an emergency device which may be strapped upon the tire and wheel of a vehicle for temporary use to extricate the car from mud, snow, ruts, or the like.

It has been an object of my invention to provide a device of this nature which may be easily and conveniently applied or removed from the tire and wheel.

Another object has been to provide such a device having locking means which shall utilize the tension placed upon the device to more securely hold it in place and prevent accidental displacement.

Another object has been to provide locking means for an emergency anti-skid chain which, when in place, are disposed at the outer side of the wheel and near the rim thereof, whereby easy access may be had thereto when attaching or detaching, and in which position such attaching means shall be remote from the tread of the tire so as to be disposed above the surface of the roadway.

Moreover, my buckle is of such a nature that the connecting strap with which it is used may be made of such material as will not injure the wheel rim or spokes or mar the finish thereof.

Furthermore, my device is provided with means whereby the connecting strap may be guided as it is threaded into the clamping means.

The above objects and advantages have been accomplished by the device shown in the accompanying drawing, of which:

Figure 1:
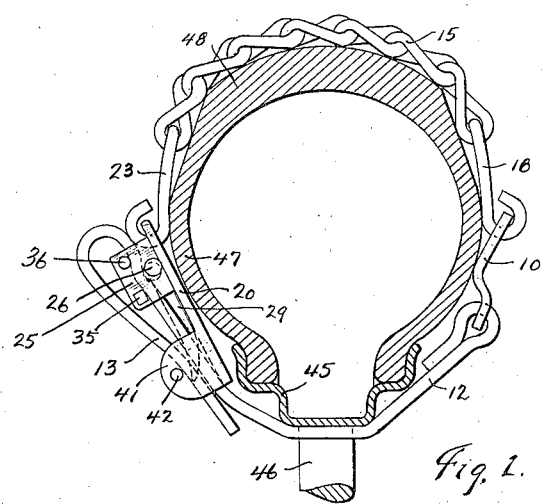
Fig. 1 is a front elevation of my invention showing it applied to an emergency anti-skid device attached to a tire and wheel.
Figure 2:
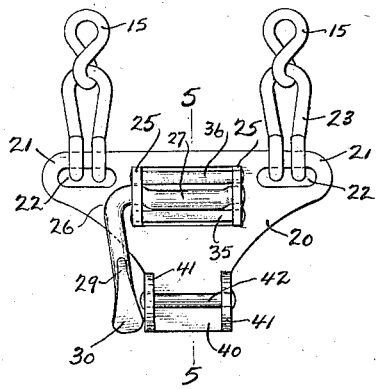
Fig. 2 is a front elevation of my invention.
Figure 3:
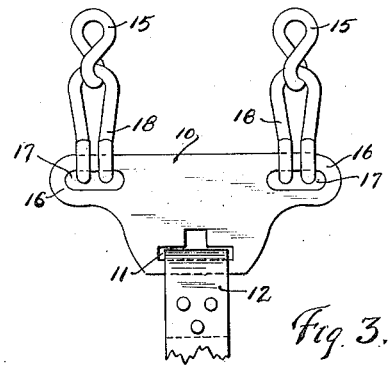
Fig. 3 is a front elevation of the strap plate used in connection with my buckle.
Figure 4:
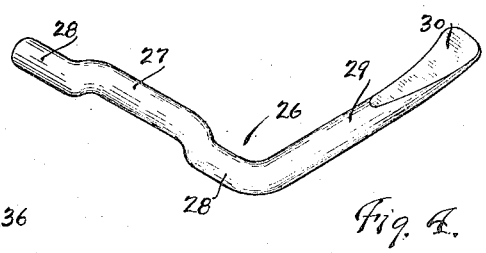
Fig. 4 is an enlarged perspective view of the eccentric lever of the buckle.

When applying my device to an anti-skid tire chain, I preferably use a strap plate 10 which is formed at one end with a slot 11 through which a strap 12 is passed. The end of the strap secured to this plate is turned upon itself as shown in Fig. 1 where it is riveted, whereby the strap is permanently secured in flexible manner to the strap plate. The strap 12 may be of any suitable or desired material but is preferably formed of a plurality of layers of rubberized fabric. In the drawing, two cross chains 15 are shown, and the strap plate is formed at each side with an outwardly extending wing 16 in each of which is formed an elongated slot 17. The slot 17 is longer than the width of the hook 18 which secures the chain 15 to the plate, so that there may be some movement of the hooks in the slots, thus making the spacing of the chains a variable element whereby their positions upon the tire may change somewhat when in use.

Secured to the other end of the chains 15 is my buckle which is formed with a lock plate 20. This plate is also provided with wings 21 which are formed like the wings 16 of the strap plate 10 with elongated slots 22 which permit a limited movement of the hooks 23. The hooks 18 and 23 are, of course, permanently secured, respectively, to the strap plate 10 and lock plate 20.

The lock plate is formed preferably between the wing portions 21 with two upstanding lock ears 25. These ears are preferably formed from the material of the plate, but it is obvious that they may be separately made and secured to the plate in any desired way. Pivotally carried by these ears is the eccentric lever 26 of my buckle. This lever is provided with an eccentric or crank portion 27 and with bearing portions 28. The bearing portions are mounted within the lock ears 25 and the end of the bearing portion 28 is riveted over on the outside of the engaging ear 25 so as to prevent the lever from becoming detached. The lever is provided with an operating arm 29 which is formed at its outer end with a flattened surface 30 forming a finger pad.

Figure 5:
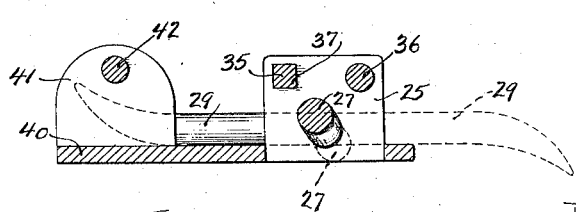
Fig. 5 is an enlarged, fragmentary, sectional view of the buckle, taken on line 5—5 of Fig. 2.

Carried by the lock ears 25 of the buckle and extending across from the one to the other is a square clamping bar 35 and a round clamping bar 36. These bars are preferably arranged equidistantly from the pivotal center of the eccentric lever 26, and the eccentric portion 27 is so positioned with respect to the lever arm 29 that when the lever arm is in the full line position of Fig. 5 the high part of the eccentric 27 will be opposite the lower adjacent corner 37 of the square clamping bar. The parts are so proportioned with respect to the thickness of the strap 12 that the space between the eccentric portion 27 and the corner 37 of the square clamping bar 35 is somewhat less than the thickness of the strap, whereby when the strap is arranged between these surfaces and the arm 29 is operated to push the eccentric lever to the full line position shown in Fig. 5, the strap will be securely clamped between the eccentric portion of the lever and the corner 37 of the square clamping bar. The eccentric lever is also shown in Fig. 5 in dotted lines in its open position in which position the eccentric portion 27 lies farthrest from the square clamping bar and in such position that the strap 12 may be easily threaded in between the eccentric portion, and the square clamping bar 35 and round clamping bar 36.

The lock plate is provided with an outwardly extending portion 40 formed at each side with an upstanding lug 41. A rod 42 which extends across the space between the lugs is carried by the lugs and it is permanently fastened thereto preferably by having its ends riveted over. The lugs 41 and rod 42 form guides for entering the strap 12 and also for receiving the free end 13 of the strap when the device has been clamped to the tire and rim of the wheel.

In Fig. 1, where I show the buckle in use, the rim of the wheel is represented at 45 and a fragmentary portion of one of the spokes at 46. The casing of the tire is represented at 47 over the tread 48 of which pass the cross chains 15.

When it is desired to attach an anti-skid device using my buckle to a tire, the cross chains are engaged with the portion of the tire most convenient to the operator, and the strap 12 is passed through the rim and between the spokes from the back side of the tire. The free end of the strap is now passed in between the guide flanges 41 of the buckle and also in between the lock ears 25, and since the eccentric lever will have been placed in the dotted line position of Fig. 5, the strap is threaded through the device in such manner that the eccentric portion 27 of the lever is at one side thereof and the square clamping bar 35 and round clamping bar 36 is disposed at the other side thereof. Since the lock plate 20 of my buckle is arranged on the face of the tire near the rim, the strap and clamp are easily manipulated. When in the position just above described, the strap is drawn to the desired position whereupon the eccentric lever 26 is moved from the dotted line position of Fig. 5 to the full line position thereof. As it is moved, the eccentric portion 27 thereof is raised, thus forcing the strap against the clamping bars 35 and 36. After the eccentric portion 27 passes the upper center of its movement, further movement will cause it to be forced more tightly in contact with the edge 37 of the square clamping bar 35. When the operating arm 29 of the lever has reached the full line position of Fig. 5, the eccentric portion will have exerted substantially its full clamping power upon the strap. It will be obvious that since the tendency on the strap is to pull out of the lock plate due to its tension, such tension will be utilized to keep the eccentric lever in its locking position. After the eccentric lever has been moved to its full locking position, the free end 13 of the strap is bent back upon itself, as shown in Fig. 1, and is passed between the guide flanges 41 and under the rod 42 attached thereto, where it will be frictionally held in place.

Since the connecting strap used in connection with my device is flexible, it is obvious that it may be adjusted to any degree of tightness about the tire and clamped in such position, and since it is made of relatively soft material, such as rubberized fabric, its use will not injure the rim or spokes or mar the finish thereof. Furthermore, because of the nature of my invention, one size of anti-skid device with which it is used is applicable to tires of various sizes.

Obviously, some modifications of the details herein shown and described may be made without departing from the spirit of my invention or the scope of the appended claims, and I do not, therefore, wish to be limited to the exact embodiment herein shown and described, the form shown being merely a preferred embodiment thereof.

Having thus described my invention, what I claim is:

1. As an article of manufacture, a buckle for clamping a strap in locked position, comprising a lock plate, lock ears formed on the plate and extending outwardly from the plate at points set in some distance from the edge of the plate, an eccentric lever rotatably carried by the lock ears, and a clamping bar carried by the lock ears and in interspaced relation with the eccentric lever.

2. As an article of manufacture, a buckle for clamping a strap in locked position, comprising a lock plate, lock ears formed on the lock plate, an eccentric lever rotatably carried by the lock ears, a square clamping bar carried by the lock ears and in interspaced relation with the eccentric lever, and guide flanges carried by the lock plate and in parallel relation with the lock ears.

3. As an article of manufacture, a buckle for clamping a strap in locked position, comprising a lock plate, lock ears formed on the lock plate, an eccentric lever rotatably carried by the lock ears, a clamping bar carried by the lock ears and in interspaced relation with the eccentric lever, guide flanges carried by the lock plate and in parallel relation with the lock ears, and a rod carried by the guide flanges and in interspaced relation with the lock plate.

4. As an article of manufacture, a buckle for clamping a strap in locked position, comprising a lock plate, an eccentric lever for the buckle, a clamping bar for the buckle, lock ears provided on the plate and formed with two pairs of apertures, one pair of apertures for rotatably receiving the eccentric lever, and the other pair of apertures for fixedly receiving the clamping bar, guide flanges carried by the lock plate and in parallel relation with the lock ears, and a rod carried by the guide flanges and in interspaced relation with the lock plate.

5. As an article of manufacture, a buckle for clamping a strap in locked position, comprising a lock plate, an eccentric lever having an eccentric portion pivotally carried by the lock plate, clamping bars carried by the lock plate and arranged in cooperative relation with the eccentric portion, said clamping bars and the eccentric portion all being located to one side of the center line dividing the ends of the buckle, and guide flanges carried by the lock plate for laterally directing the strap between the eccentric portion and the clamping bars.

6. As an article of manufacture, a buckle for clamping a strap in locked position, comprising a lock plate, an eccentric lever having an eccentric portion pivotally carried by the lock plate, a clamping bar carried by the lock plate and arranged in spaced cooperative relation with the eccentric portion, said clamping bar and eccentric portion both being located to one side of the center line dividing the ends of the buckle, said plate having slots at the end thereof which is adjacent to the clamping bar and the eccentric portion for receiving chains or the like, and guide flanges carried by the lock plate for laterally directing the strap between the eccentric portion and the clamping bar.

7. As an article of manufacture, a buckle for clamping a strap in locked position, comprising a lock plate, an eccentric lever having an eccentric portion pivotally carried by the lock plate, a clamping bar carried by the lock plate and arranged in spaced cooperative relation with the eccentric portion, said clamping bar being located closer to one end of the lock plate than the other, means at one end of the plate for securing chains thereto, guide flanges at the opposite end of the buckle for guiding the strap between the clamping bar and the eccentric portion, and a rod carried by the guide flanges for retaining the free end of the strap thereunder.

FRANK E. STAHL.